United States Patent [19]

Jones et al.

[11] Patent Number: 4,788,675

[45] Date of Patent: Nov. 29, 1988

[54] MUSIC DELIVERY SYSTEM

[76] Inventors: Markley L. Jones, 5143 Roswell Rd. #4, Atlanta, Ga. 30342; Lee Edwards, 2406 Woodward Way N.W., Atlanta, Ga. 30305; John H. Bordelon, 1132 Research Dr., Marietta, Ga. 30066

[21] Appl. No.: 917,526

[22] Filed: Oct. 10, 1986

Related U.S. Application Data

[63] Continuation-in-part of Ser. No. 538,573, Oct. 3, 1983, abandoned.

[51] Int. Cl.[4] .......................... H04J 1/08; G11B 5/02

[52] U.S. Cl. .................................... 370/69.1; 360/20; 381/80

[58] Field of Search .................... 360/18, 19.1, 20, 22; 358/343; 370/69.1, 120; 381/80, 81

[56] References Cited

U.S. PATENT DOCUMENTS 3,829,610 8/1974 Megussen et al. .................... 360/20

3,860,873 1/1975 Ringstad ............................ 370/124

FOREIGN PATENT DOCUMENTS 790479 2/1958 United Kingdom ............... 370/69.1

OTHER PUBLICATIONS

Baack et al–Analogue Optical Transmission–Electronics Letters, 10 May 1979–vol. 15, No. 10, pp. 300–301.

*Primary Examiner*—Robert L. Griffin
*Assistant Examiner*—Andrew J. Telesz, Jr.

[57] ABSTRACT

A music delivery arrangement permitting a subscriber to select from among a plurality of available music selections, particular selections that he wishes to hear at any time. The plurality of music selections are "played" at a central "jukebox" facility. They are frequency multiplexed onto one or more communication channels that are typically used to carry video information, such as cable television channel. The video channel information is distributed to individual subscribers either via unused channels of a cable television system, by direct broadcast at commercial television frequencies, by direct satellite transmission to a subscriber, or by some other means. The subscriber uses a converter box to demultiplex and thereby select a desired musical selection for demodulation. Demodulation can take place in the subscriber's FM broadcast receiver or in some other apparatus. Music selections are selected in a similar fashion to the manner in which particular channels of a cable television system are selected for video viewing. The music on the sub-channels is continuously played in such a way than any specific selection can be chosen at any time.

16 Claims, 3 Drawing Sheets

MUSIC DELIVERY SYSTEM

RELATED APPLICATIONS

This application is a continuation - in - part (CIP) of U.S. application Ser. No. 538,573 which was filed on Oct. 3, 1983 and which is now abandoned.

BACKGROUND OF THE INVENTION

This invention is directed to an arrangement for delivering music selections or other audio information "on demand" to subscribers, the information being stored at a central facility. The music delivery system is configured to function like a "jukebox", which allows a subscriber to select and hear any musical selection contained in the central facility "library" whenever he desires. The central facility could be equipped to serve rooms in a hotel or business complex, or residences and businesses throughout a city, an entire region or an even larger area by means of a transmission system which could include coaxial cable, fiber optic transmission facilities, satellite links, television or radio broadcast, etc.

From the user's viewpoint, the invention can perhaps be best explained as a system that functions somewhat like a "jukebox". The traditional jukebox is a unit in which are stored a plurality of records. A user selects, by the manipulation of switches, a particular record to be played. That record is played and all those within earshot of the jukebox speakers listen to the record which has been selected.

An improved version of the traditional jukebox can be found in many restaurants. A separate selector box and speaker are placed at each table in the restaurant. The jukebox is wired to each selector box so that a record can be selected by a patron at any table. Of course, only one record at a time is played and the music is delivered directly to the speaker at the table.

A music lover is able to bring into his home particular audio entertainment that he or she wishes to hear by buying records and playing them on a home high-fidelity stereo system. However, the expense of the recordings puts building a vast "library" of music beyond the reach of many people. Music selections gain and lose popularity and keeping up with the latest hits requires a continuing expense.

An alternative is for the music lover to listen to radio broadcasts. However, at any moment, he can only listen to what the disc jockey has selected. There is no way to hear particular songs when the listener wishes to hear them without buying a record or a cassette tape.

SUMMARY OF THE INVENTION

The present invention is an alternative to this situation by providing an arrangement whereby a music lover can choose any particular record within a central "library" of recordings to listen to at any time without the need to maintain an "inventory" of records in his home. A subscriber simply manipulates a keyboard to select a particular song or sequence of songs desired.

The subscriber receives music from a central library through the same cable that provides cable television to the subscriber's home, business or other location. The music delivery system according to the present invention can utilize an existing cable TV system without the need to rewire countless homes.

Typically, a television cable system brings a cable to each subscriber's home from a cable "headend". This cable carries 30 or more video information channels, each channel being about 6 MHz. in bandwidth. The subscriber is provided with a converter box which selectively converts a desired channel to a particular unused video broadcast channel in the area such as, for example, channel 3. The subscriber tunes the television to channel 3 and leaves it tuned to that channel. As different cable video channels are to be viewed, they are each converted to channel 3. Conversion usually takes place in a converter box having a plurality of switches for selecting a desired cable channel.

Most cable television systems have a number of channels which are unused or which can be made vacant for use by the music delivery system. The music delivery system according to the present invention frequency multiplexes approximately 30 to 200 audio channels into a 6 MHz bandwidth video channel so that 30 to 200 different audio "sub-channels" can be simultaneously transmitted via a single video channel.

In one embodiment, a particular audio selection is played continuously (over and over again) on a given audio sub-channel. To hear a desired selection, the particular sub-channel on which that selection plays is demultiplexed by converting it to a predetermined frequency such as, for example, a frequency within the pass band of an FM stereo receiver or the sound intermediate freqency (I.F.) of a television. A particular video channel of a cable system carrying the audio sub-channels can be selected on the subscriber's already existing video converter box. An additional converter box can be used to tune to the particular audio sub-channel carrying the music selection desired.

Such a capability can be provided to a large number of users or subscribers in the manner described below. The explanation is given in terms of a cable television network serving subscribers throughout a city, but essentially the same technique can be used to serve users within a smaller zone such as a hotel or business complex or throughout an area much larger than a single city.

A certain frequency band within the transmission band of a cable television system is designated for the subject audio distribution service. A composite signal fitting within this band is generated at the headend of the cable system. This composite signal consists of RF carrier signals, each of which is modulated with the audio signal of a different one of the musical selections that are to be made available to the user, and each carrier's center frequency is sufficiently separated in frequency from all the others to prevent cross talk. The carriers could, for example, be equally separated by 100 to 400 KHz. The modulation could be AM or FM.

Each modulated carrier thus contains the signal of a single musical selection (which may be repeated continuously). The composite signal fed into the cable.headend is composed of all the modulated carriers. It is a frequency-multiplexed signal. At the subscriber's end, the desired musical selection can be recovered by standard frequency demultiplexing techniques so that the carrier signal which corresponds to the desired musical selection is separated and then detected to recover the audio signal.

The invention provides a method of delivering audio information comprising the steps of:

(a) generating electrical signals corresponding to a plurality of different pieces of audio information:

(b) dividing the plurality of different pieces of audio information into several groups, and frequency multiplexing the signals within each group so that each group thus multiplexed forms a different first composite signal;

(c) recording these first composite signals onto separate tracks of a single wideband recording medium;

(d) playing the recording medium to reproduce simultaneously the several first composite signals;

(e) frequency "stacking" the several first composite signals to form a second composite signal having a bandwidth wider than that of said first composite signals, the second composite signal being a multiplexed signal composed of the several first composite signals each shifted in frequency appropriately for transmission through a transmission medium;

(f) transmitting the second composite signal to a subscriber;

(g) demultiplexing at the subscriber from the second composite signal a particular one of said plurality of pieces of audio information; and (h) transducing the demultiplexed signal into an audio signal.

The invention also provides an apparatus for delivering audio information comprising:

(a) means for generating electrical signals corresponding to a plurality of different pieces of audio information;

(b) means for dividing the plurality of different pieces of audio information into several groups, and frequency multiplexing the signals within each group so that each group thus multiplexed forms a different first composite signal;

(c) means for recording these first composite signals onto separate tracks of a single wideband recording medium;

(d) means for playing the recording medium to reproduce simultaneously the several first composite signals;

(e) means for frequency "stacking" the several first composite signals to form a second composite signal having a bandwidth wider than that of said first composite signals, the second composite signal being a multiplexed signal composed of the several first composite signals each shifted in frequency appropriately for transmission through a transmission medium;

(f) means for transmitting the second composite signal to a subscriber;

(g) means for demultiplexing at the subscriber from the second composite signal a particular one of said plurality of pieces of audio information; and (h) means for transducing the demultiplexed signal into an audio signal.

BRIEF DESCRIPTION OF THE DRAWINGS

The presently preferred embodiments of the invention will be described in further detail with reference to the accompanying drawings, wherein.

DETAILED DESCRIPTION OF THE PREFERRED EMBODIMENTS

Figure 1:
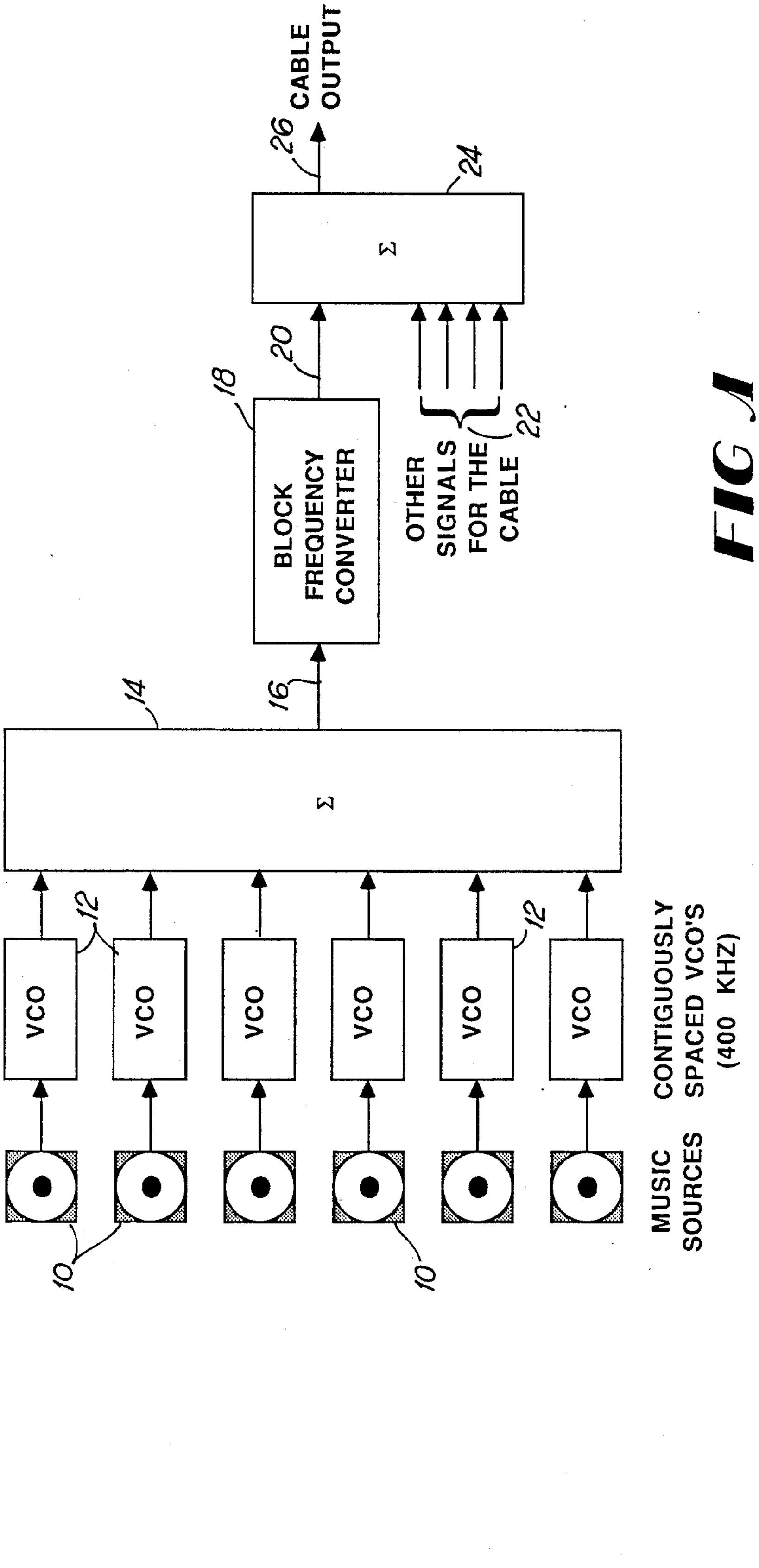
FIG. 1 is a block diagram of an arrangement for generating the frequency multiplexed composite signal according to the invention.

FIG. 1 shows schematically one arrangement for generating a frequency multiplexed composite signal which includes 30 to 200 different audio "sub-channels". A plurality of music sources 10 each provide a different musical selection. Music sources 10 could be any type of music source, such as a tape, record, laser disk, etc. Music sources 10 are played repetitively and continuously. Each music source provides an output to a corresponding voltage controlled oscillator (VCO) 12. These oscillators have center frequencies spaced at 400 kHz. intervals. Outputs of VCOs 12 are summed by a summer 14 to form a frequency multiplexed composite signal 16. Composite signal 16 is block frequency converted by a block frequency converter 18 to a designated video channel for transmission onto a cable at the head-end of a cable television system. Block frequency converter 18 provides an output signal 20 on a video channel that is mixed with other signals 22 provided by the cable television system in a summer 24 to provide a cable output signal 26 at the head-end of the cable television system.

The composite signal generated at the headend could be generated in "real" time by (1) "playing" the recordings of each of the 30 to 200 musical selections repetitively and continually, (2) having the audio output of each audio playback unit control the frequency of a voltage controlled oscillator (VCO), (3) having the center frequencies of the VCOs adequately separated in frequency (for example, 400 KHz) to prevent cross talk, (4) summing these signals to form a frequency multiplexed composite signal, (5) block converting the frequency multiplexed composite signal to the appropriate, designated frequency band for transmission on the cable, and (6) combining the signal thus produced with other signals for transmission through the cable system. Of course, composite signal 16 would not have to be block converted and placed directly onto a cable television system via summer 24. It could, instead, be transmitted via some communication channel to another system.

Figure 2:
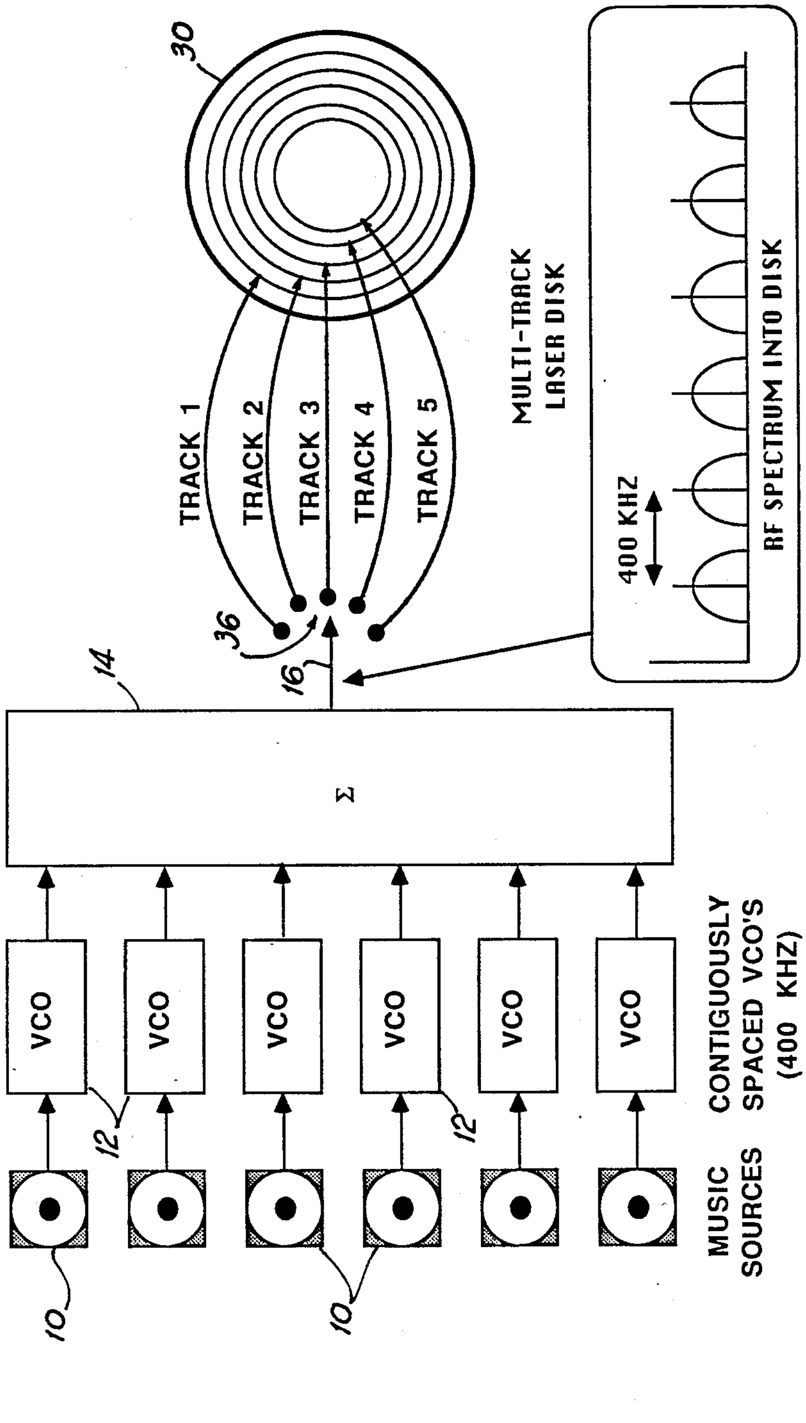
FIG. 2 is a block diagram showing the recording scheme for placing signals onto a multi-track laser disk according to the invention.

The technique described above, used at each cable television system headend, is somewhat impractical because of the large number of playback units and VCOs that would be required at each cable headend. This impracticality is overcome by using a recording technique as shown in FIG. 2. It is possible to take advantage of the wide bandwidth (several megaHertz) capability of the laser disk recording medium.

FIG. 2 shows a recording scheme for recording composite signal 16 onto a multi-track laser disc 30. In FIG. 2, music sources 10 are "played" into respective VCOs 12 as in the FIG. 1 arrangement. The music selections are recorded onto the disk by having each music selection frequency modulate its own individual VCO. The oscillators are all on different frequencies, contiguously spaced 400 KHz apart. The output signals from VCOs 12 are summed by summer 14 to provide composite signal 16. The RF spectrum of composite signal 14 is shown graphically in FIG. 2. Composite signal 16 is recorded directly on the various tracks of laser disk 30.

For convenience in demultiplexing, the format shown graphically in FIG. 2 utilizes a spacing of 400 kHz which is similar to that used on a commercial FM broadcast band.

Using present laser disk technology, the highest frequency capable of being stored is approximately 4 MHz. Up to ten musical selections could be stored on a single track of a laser disk although this number is variable. Several separate and distinct tracks of laser disk 30 are utilized. Each track has an approximate playing time of 3–4 minutes. Since the total track length of a disk is, using present technology, many times longer than this, it is contemplated that multiple tracks (5 are shown in FIG. 2) be used. Thus, a single disk can easily hold 40 selections multiplexed into a composite signal 16. Each track would include multiple musical selections, but the set of center frequencies of the VCOs used for each track would be the same.

The same set of VCOs could be used to record, at different times, the various tracks of laser disk 30. In order to illustrate this graphically, there is shown in FIG. 2 a five position switch 36 which can couple composite signal 16 to a record head for any of tracks 1–5. The signal from summer 14 is first directed by switch 36 to Track 1 to record the composite signal that contains the first N musical selections to be recorded, where N is the number of VCOs and music sources (only 6 are shown in FIG. 2). After the first N selections have been recorded, the multi-position switch is moved to position 2, recordings of the next N musical selections are placed on the music sources, and the composite signal containing the next N musical selections is recorded on track 2, and so forth, until all the tracks are filled. If there are M different tracks, and N selections can be recorded on each track, then the total number of musical selections that can be recorded on a single disk is $M \times N$. Thus, as shown in the Figure, six music selections (six music sources played through six VCOs) could be summed to form a first composite signal 16 that is recorded on track 1. After, that, six different musical selections played through the same VCOs 12 to form a new composite signal 16 could then be recorded on track 2, etc.

For convenience in drawing, only six music sources and six VCOs are shown. However, this number is only for illustrative purposes and could be far greater. The storage capacity of laser disk 30 is limited only by the state of the art in laser disk technology.

A laser disk having been recorded in this manner can be replicated and distributed to various cable head-ends. At each head end, the disk is played back to recover the signals on each track.

Thus, the method of storing the multiplicity of musical selections on the disk is that of frequency-division multiplexing. For convenience in demultiplexing, the frequency modulation format and the spacing of the oscillator frequencies is identical to that used on the standard FM broadcast band. The exact frequencies used are not those used on the FM broadcast band (88 MHz to 108 MHz) because such frequencies are too high for recording on presently available laser disk media. The highest frequency capable of being stored on such a disk (at the time this patent application was written) is approximately 4 MHz. Up to ten music selections might thus be stored on a single track on a laser disk, although the exact number will depend on the exact characteristics of the laser disk to be used.

Figure 3:
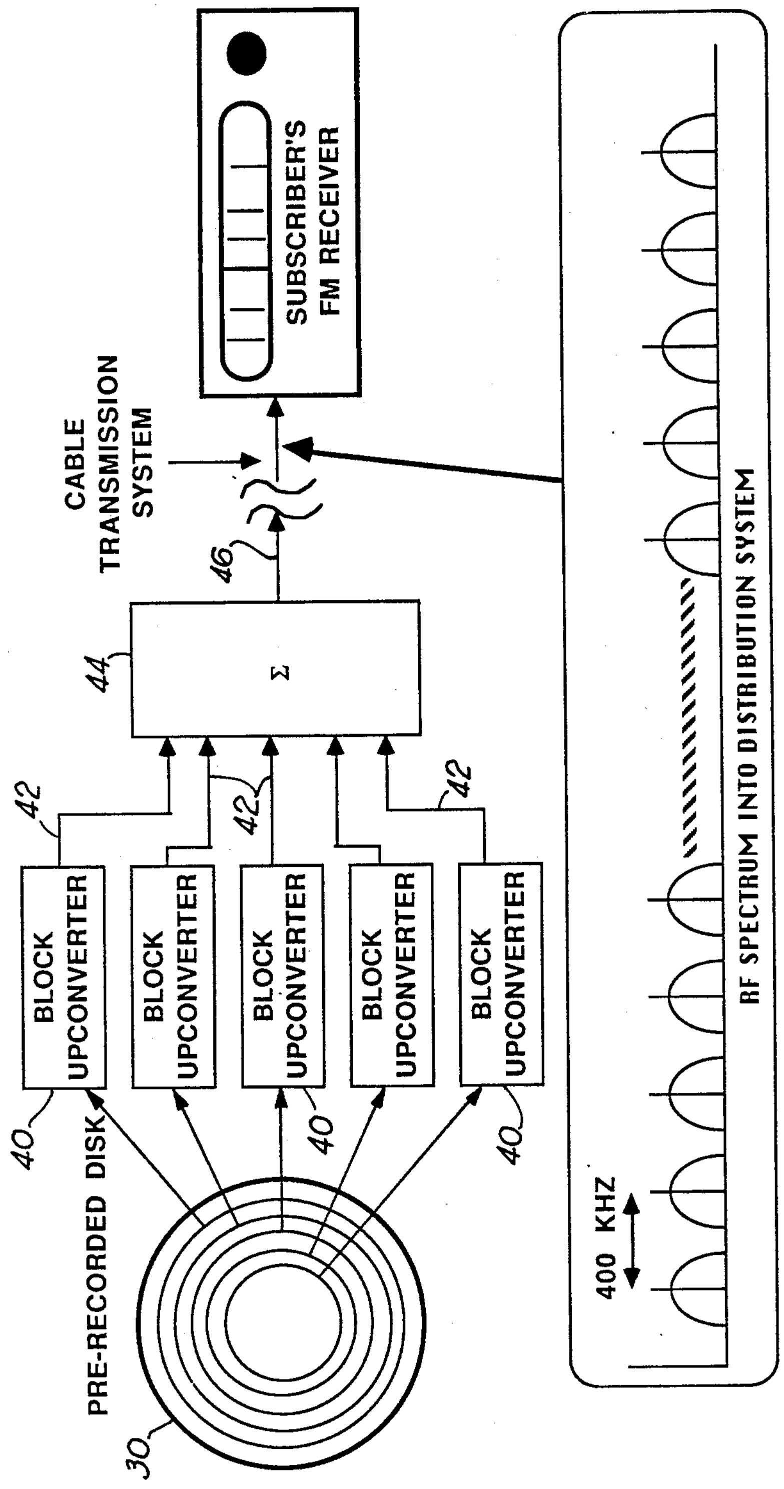
FIG. 3 is a schematic diagram of a playback, distribution and subscriber interface according to the invention.

Copies of this disk may then be distributed to all cable headends using this service. FIG. 3 shows a playback distribution and subscriber interface. The signal from each track is recovered using a different laser beam. For convenience, five tracks are shown in FIG. 3, each providing a separate composite signal to an associated block up-converter 40. Five laser beams would recover five separate signals. Each of the five composite signals contains N audio selections (FIG. 2 shows an example for which $N=6$). These N audio selections are frequency multiplexed to separate them from the others within that composite signal. No demodulation and recovery of the individual music selections takes place at this point. Rather, the various sets of composite signals each containing N musical selections are "stacked" in frequency using block frequency up conversion.

Up conversion results in a set of FM signals with each signal containing one of the music selections as shown in the RF spectrum distribution in FIG. 3. The signals are spaced contiguously in frequency covering the 20 MHz range of the standard FM broadcast band or some other set of frequencies of greater or lesser extent. The signal spectrum shown is the result of summing signals 42 from each of the block up-converters 40 in a summer 44 to provide a single composite signal 46. It is this composite signal 46 that is transmitted to individual subscribers over cable, optic fiber or other appropriate media. The subscriber selects the desired musical selection by tuning in the desired selection with a standard FM broadcast receiver or special receiver designed and distributed for this service.

The uniqueness of this system is the unorthodox way in which laser disk technology is used to eliminate the need for the cable headend operator or other service provider to have on hand a large amount of additional electronic equipment or a large number of recording media, one for each musical selection to be made available. All selections are available at the subscriber's equipment, and since the laser disk is simply replayed over and over again, the subscriber may choose the selection he desires at anytime. He will have to wait until the desired selection begins, however, and cuing tones to designate the beginning and end of each selection will probably be included with the music selection. This equipment could be replaced with a multitrack tape recorder or perhaps some other recording media, but these are not presently preferred as alternatives to the laser disk medium which has the potential for long playing without serious wear and frequent failure.

An alternative technique that would allow delivery of a composite signal containing a plurality of frequency multiplexed audio selections to a number of cable headends from a single facility but also has the advantage of not requiring each cable headend to have a large amount of additional electronic equipment or recording media, is the use of a satellite link. The signal shown in FIG. 1 as "Cable output" could be sent via satellite to a large number of cable headends (or directly to subscribers) without the use of the wideband recording technique shown in FIGS. 2 and 3. However, the cost of the satellite link, which would have to operate at all times that the service is offered, is thought to make this alternative not economically attractive at the present time, and therefore not a preferred embodiment.

The subscriber's audio converter box includes a microprocessor based control system with a memory so that the user could program a sequence of desired musical selections, including repeat plays of a single song or a variety of songs in a predetermined order. The converter box would respond to the control system by tuning to each particular appropriate audio sub-channel in the order programmed by the user.

The "jukebox" concept claimed herein is not limited to cable television systems. Future home communication and entertainment techniques will doubtless involve transmission of signals by optical fiber, and this technology will greatly enhance the utility and practicality of the subject invention.

We claim:

1. A method of delivering audio information comprising the steps of:
   generating electrical signals corresponding to a plurality of different pieces of audio information;
   dividing the plurality of different pieces of audio information into several groups, and frequency multiplexing the signals within each group so that each group thus multiplexed forms a first composite signal;
   recording these first composite signals onto separate tracks of a single wideband recording medium;
   playing the recording medium to reproduce simultaneously the several first composite signals;
   frequency "stacking" the several first composite signals to form a second composite signal having a bandwidth wider than that of said first composite signals, the second composite signal being a multiplexed signal composed of the several first composite signals each shifted in frequency appropriately for transmission through a transmission medium;
   transmitting the secon composite signal to a subscriber;
   demultiplexing at the subscriber from the second composite signal a particular one of said plurality of pieces of audio information; and
   transducing the demultiplexed signal into an audio signal.

2. A method according to claim 1 wherein said step of transmitting comprises the step of transmitting through a coaxial cable.

3. A method according to claim 1 wherein said step of transmitting comprises the step of transmitting through an optical fiber.

4. A method according to claim 1 wherein said step of transmitting comprises the step of transmitting through a wide band electromagnetic radiation communications channel.

5. A method according to claim 1 wherein said step of recording comprises the step of recording on an optical medium.

6. A method according to claim 1 wherein said step of recording comprises the step of recording on a laser disk.

7. A method according to claim 1 wherein said step of transducing comprises the step of transducing using a radio receiver.

8. A method according to claim 1 wherein said step of transducing comprises the step of transducing using an FM broadcast radio receiver.

9. An arrangement for delivering audio information comprising:
   means for generating electrical signals corresponding to a plurality of different pieces of audio information;
   means for dividing the plurality of different pieces of audio information into several groups, and frequency multiplexing the signals within each group so that each group thus multiplexed forms a first composite signal;
   means for recording these first composite signals onto separate tracks of a single wideband recording medium;
   means for playing the recording medium to reproduce simultaneously the several first composite signals;
   means for frequency "stacking" the several first composite signals to form a second composite signal having a bandwidth wider than that of said first composite signals, the second composite signal being a multiplexed signal composed of the several first composite signals each shifted in frequency appropriately for transmission through a transmission medium;
   means for transmitting the second composite signal to a subscriber;
   means for demultiplexing at the subscriber from the second composite signal a particular one of said plurality of pieces of audio information; and
   means for transducing the demultiplexed signal into an audio signal.

10. An arrangement according to claim 9 wherein said transmitting means comprises a coaxial cable.

11. An arrangement according to claim 9 wherein said transmitting means comprises an optical fiber.

12. An arrangement according to claim 9 wherein said transmitting means comprises a wide band electromagnetic radiation communications channel.

13. An arrangement according to claim 9 wherein said recording means comprises an optical recording medium.

14. An arrangement according to claim 9 wherein said recording means comprises a laser disk.

15. An arrangement according to claim 9 wherein said means for transducing comprises a radio receiver.

16. An arrangement according to claim 15 wherein said radio receiver comprises an FM broadcast receiver.

* * * * *